US008562000B2

(12) United States Patent

Moehrle et al.

(10) Patent No.: US 8,562,000 B2

(45) Date of Patent: Oct. 22, 2013

(54) TURBINE COMBUSTION SYSTEM TRANSITION PIECE SIDE SEALS

(75) Inventors: Frank Moehrle, Palm City, FL (US); Andrew R. Narcus, Loxahatchee, FL (US); John Carella, Jupiter, FL (US); Jean-Max Millon Sainte-Claire, Jupiter, FL (US)

(73) Assignee: Siemens Energy, Inc., Orlando, FL (US)

( * ) Notice: Subject to any disclaimer, the term of this patent is extended or adjusted under 35 U.S.C. 154(b) by 0 days.

(21) Appl. No.: 13/276,439

(22) Filed: Oct. 19, 2011

(65) Prior Publication Data

US 2012/0292861 A1 Nov. 22, 2012

Related U.S. Application Data

(60) Provisional application No. 61/488,218, filed on May 20, 2011.

(51) Int. Cl.
*F16J 15/02* (2006.01)

(52) U.S. Cl.
USPC .......... 277/644

(58) Field of Classification Search
USPC .......... 277/644, 643
See application file for complete search history.

(56) References Cited

U.S. PATENT DOCUMENTS 4,785,623 A 11/1988 Reynolds
4,902,198 A * 2/1990 North .......... 415/115
5,361,828 A * 11/1994 Lee et al. .......... 165/109.1
5,400,586 A 3/1995 Bagepalli et al.
5,474,306 A 12/1995 Bagepalli et al.
5,975,844 A * 11/1999 Milazar et al. .......... 415/138
6,162,014 A * 12/2000 Bagepalli et al. .......... 415/170.1
6,450,762 B1 9/2002 Munshi
6,547,257 B2 4/2003 Cromer
6,588,214 B2 7/2003 Mack et al.
6,675,584 B1 1/2004 Hollis et al.
6,834,507 B2 12/2004 Jorgensen
7,367,567 B2 * 5/2008 Farah et al. .......... 277/650
7,527,469 B2 5/2009 Zborovsky et al.
7,584,620 B2 9/2009 Weaver et al.
7,784,264 B2 8/2010 Weaver et al.
8,162,598 B2 * 4/2012 Liang .......... 415/174.1
2002/0121744 A1 9/2002 Aksit et al.
2009/0026713 A1 1/2009 Fujimoto et al.
2010/0092278 A1 * 4/2010 Major et al. .......... 415/160
2010/0314930 A1 * 12/2010 Akaike et al. .......... 297/468

FOREIGN PATENT DOCUMENTS

EP 0989287 A2 3/2000
EP 1566521 A1 8/2005

* cited by examiner

*Primary Examiner* — Vishal Patel
*Assistant Examiner* — Thomas Neubauer

(57) ABSTRACT

A seal strip (54) with a central relatively thin portion (68) and first and second thicker side portions (70, 72) that may be wedge-shaped adjacent the central portion. Each side portion may be formed of a linear array of base-in prisms (56), where each prism includes a base adjacent and normal to the central portion, and a thickness tapering distally toward an adjacent edge of the seal strip. The base-in prisms of each side portion may be separated by transverse slots (55) along the length of the strip. The transverse slots of the first side portion may be unaligned with the transverse slots of the second side portion along the length of the strip. A retention pin (58) may extend normally from an end of the seal strip. The seal strip may be mounted in tapered slots (49) of a gas turbine transition exit frame (48).

15 Claims, 4 Drawing Sheets

60

TURBINE COMBUSTION SYSTEM TRANSITION PIECE SIDE SEALS

This application claims benefit of the 20 May 2011 filing date of U.S. Application No. 61/488,218 which is incorporated by reference herein.

FIELD OF THE INVENTION

This invention relates to seals in the combustion section of gas turbines, and particularly to side seals between adjacent transition duct exit frames.

BACKGROUND OF THE INVENTION

The combustion system of a gas turbine is designed to contain the hot gasses and flame produced during the combustion process and to provide an efficient channel to transport the hot gas to the turbine section of the engine. An industrial gas turbine engine commonly has several individual combustion device assemblies arranged in a circular array about the engine shaft. A respective circular array of transition ducts, also known as transition pieces, connects the outflow of each combustor to the turbine inlet. Each transition piece may be a tubular or other appropriately shaped structure that channels the combustion gas between a combustion chamber and the first row or stage of stationary vanes or nozzles of the turbine section.

The interface between the combustion system and the turbine section occurs between an exit frame on the downstream end of each transition piece and the inlet of the turbine. Each exit frame mates with a first stage vane retaining ring or element. Upper and lower seals are provided on each exit frame to seal against respective radially outer and inner retainer elements of the first stage vanes to minimize leakage between the transition ducts and the nozzles. Side seals between each pair of adjacent exit frames minimize leakage between the exit frames. The effectiveness and reliability of both types of seals are important to achieving engine efficiency and performance goals.

BRIEF DESCRIPTION OF THE DRAWINGS

The invention is explained in the following description in view of the drawings that show.

DETAILED DESCRIPTION OF THE INVENTION

Figure 1:
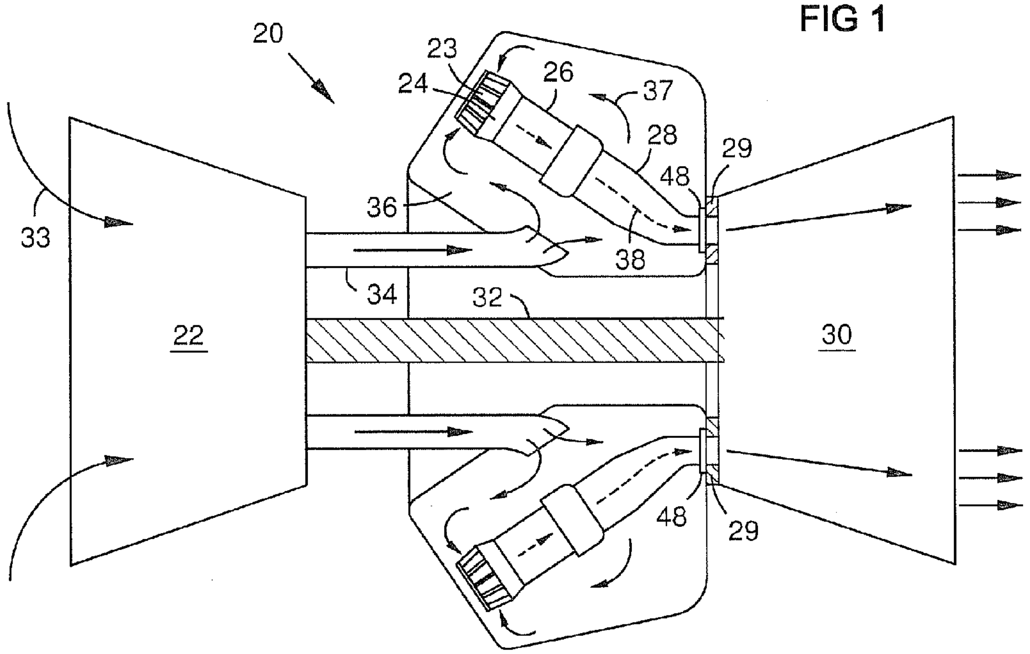
FIG. 1 is a schematic view of an exemplary gas turbine design within which embodiments of the invention may be employed.

FIG. 1 is a schematic view of an exemplary gas turbine engine 20 that may include a compressor 22, fuel injectors contained within a cap assembly 24, combustion chambers 26, transition pieces 28, a turbine section 30 and an engine shaft 32 by which the turbine 30 drives the compressor 22. Several combustor assemblies 24, 26, 28 may be arranged in a circular array in a can-annular design. During operation, the compressor 22 intakes air 33 and provides a flow of compressed air 37 to the combustor inlets 23 via a diffuser 34 and a combustor plenum 36. The fuel injectors within cap assembly 24 mix fuel with the compressed air. This mixture burns in the combustion chamber 26 producing hot combustion gas 38, also called the working gas, that passes through the transition piece 28 to the turbine 30 via a sealed connection between an exit frame 48 of the transition piece 28 and turbine inlet hardware 29. The diffuser 34 and the plenum 36 may extend annularly about the engine shaft 32. The compressed airflow 37 in the combustor plenum 36 has higher pressure than the working gas 38 in the combustion chamber 26 and in the transition piece 28.

Figure 2:
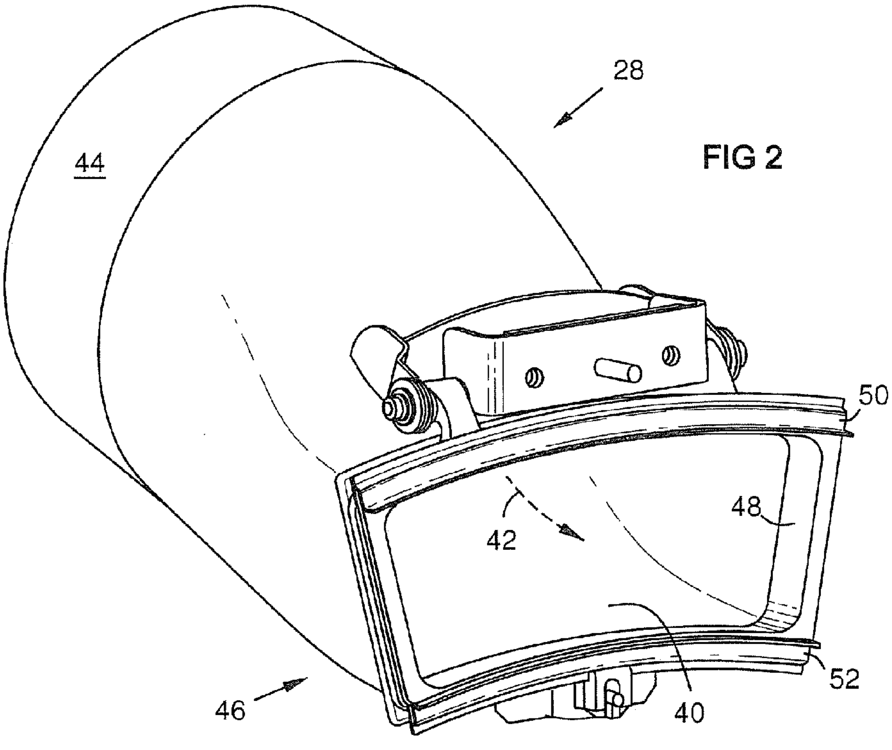
FIG. 2 is a perspective aft view of a combustion system transition piece.

FIG. 2 is a perspective view of a transition piece 28 that may include a tubular or other appropriately shaped enclosure 40 bounding the working gas flow 42. For example, the upstream end 44 may be circular and the downstream end 46 may be approximately rectangular with curvature to match the turbine inlet curvature. An exit frame 48 may be attached to the downstream or exit end of the transition piece 28 by welding or other means. The exit frame 48 mates with the turbine inlet hardware 29 (FIG. 3) via upper and lower seals 50, 52. The exit frame 48 may be attached to the turbine inlet hardware 29 by bolts or other appropriate means. Minimizing leakage between the exit frame 48 and the turbine inlet hardware, and between adjacent exit frames 48, is critical to achieving engine efficiency and performance goals.

Figures 3, 4:
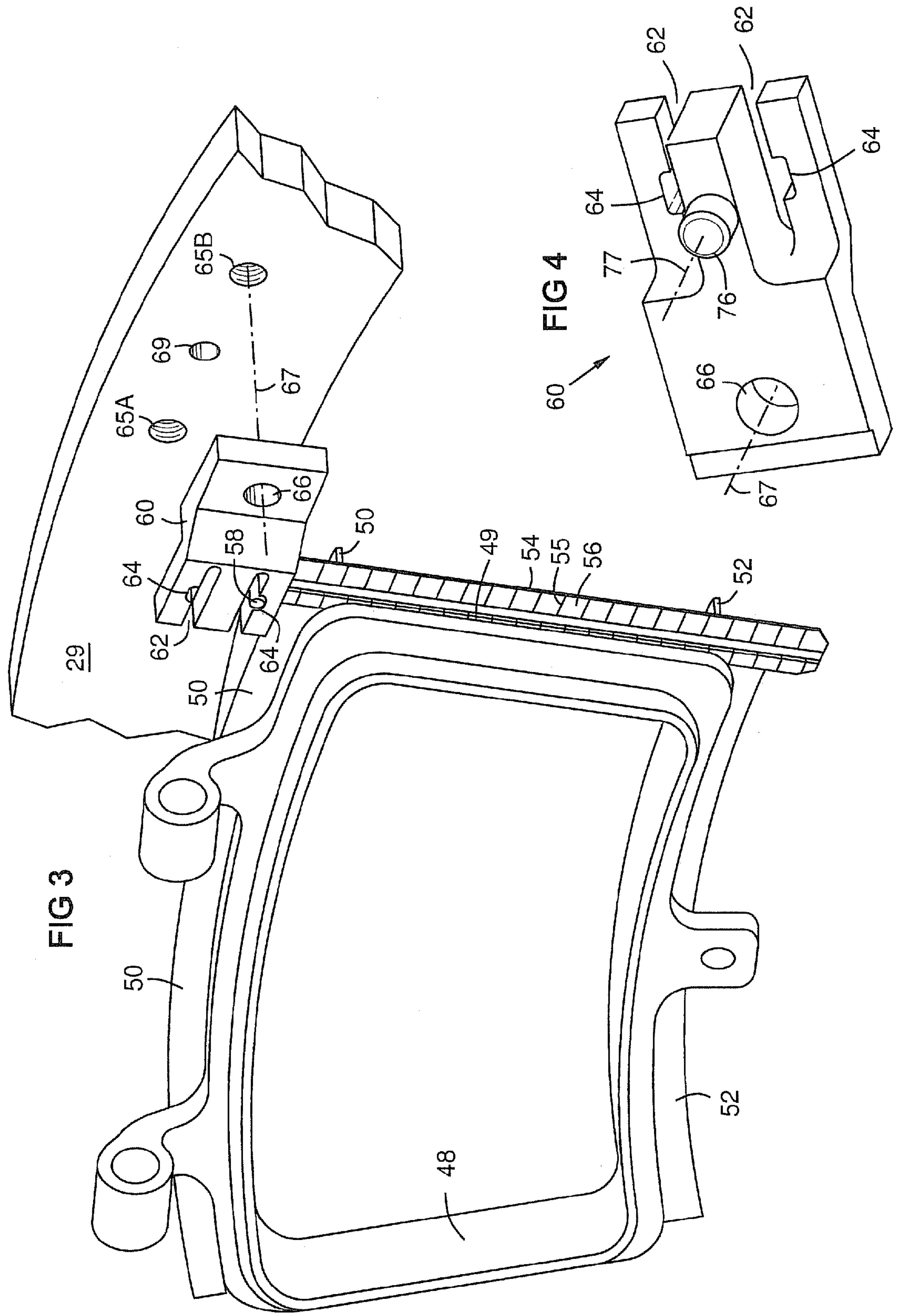
FIG. 3 is a perspective view of a transition piece exit frame with a side seal in accordance with aspects of the invention.
FIG. 4 is a rear perspective view of a seal strip retention block having two slots.

FIG. 3 is a front perspective view of an exit frame 48 ("front" means the upstream or forward side relative to the working gas flow 42). An exemplary side seal strip 54 in accordance with aspects of the invention is inserted into a side slot 49 or other appropriately configured recess portion formed within the exit frame 48. The side seal may be formed of a cobalt-based alloy such as conforming to AMS 5537, for example, (Haynes® 25/L-605 alloy) or other known material appropriate for the application. The side seal strip 54 may be disposed between and/or adjacent to the upper and lower seals 50, 52. Side seal strip 54 may include an imperforate minimum thickness and have a plurality of transverse slots 55 for flexibility between tapered thickening portions 56. Seal strip 54 may include a retention pin 58 at one end for retention of the seal strip 54 by a retention block 60. The retention block 60 may have at least one retention well 64 for retaining the retention pin 58 and centering it between adjacent exit frames 48. The retention block 60 may have a bolt hole 66 and/or other means to fasten the retention block 60 to the turbine inlet hardware 29. The inlet hardware 29 may have alternate threaded bolt holes 65A, 65B on opposite sides of a block alignment pin hole 69 for a reversible embodiment of the retention block 60 as later described.

FIG. 4 is a rear perspective view of the seal strip retention block 60 that may have two slots 62 to receive the seal strip retention pin 58. Each slot 62 may include a retention well 64 for centering the retention pin 58 between adjacent exit frames 48. A bolt hole 66 provides means to fasten the retention block 60 to the turbine inlet hardware 29. A block alignment pin 76 may extend backward from the retention block 60. Alignment pin 76 may be inserted into a hole 69 in the turbine inlet hardware 29 to align the position of the retention block 60 in conjunction with a bolt in the bolt hole 66. The retention block 60 may be symmetric about a plane defined by axes 67, 77 of the bolt hole 66 and the alignment pin 76. Axes

67, 77 are parallel to each other and parallel to the retention pin 58. The block alignment pin 76 may be located at a geometric center between the two retention wells 64. This allows the retention block 60 to be reversed 180 degrees about the alignment pin 76 in order to use an alternate one of the threaded bolt holes 65A, 65B in the turbine inlet hardware 29. Thus, if one of the retention wells 64 becomes worn, or if one of the threaded bolt holes 65A, 65B in use becomes worn, the retention block 60 can be reversed to a second one of the threaded bolt holes 65A, 65B, and continued in use.

Figure 5:
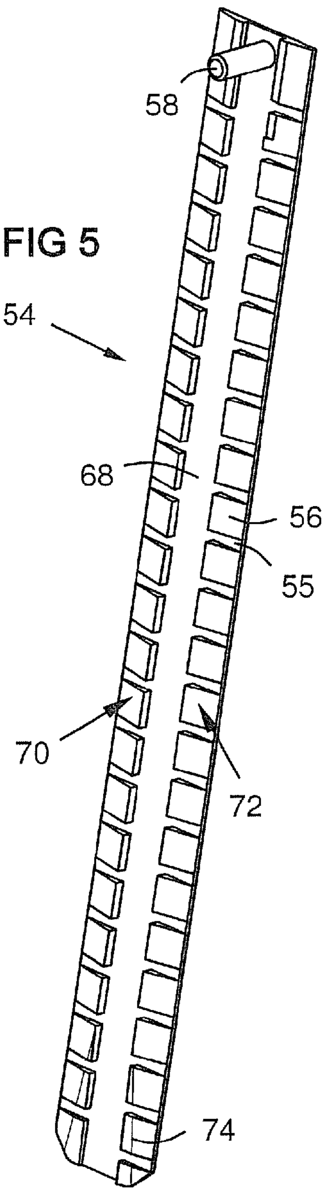
FIG. 5 is a perspective view of an exemplary exit frame side seal in accordance with aspects of the invention.

FIG. 5 is a front perspective view of a seal strip 54 comprising a central portion 68 with a first thickness that may extend over the length of the seal strip 54. This first thickness of the central portion 68 may be same as an imperforate minimum thickness of seal strip 54, as exemplified in this view. Embodiments of the invention allow for the first thickness of the central portion 68 to vary in order to accommodate particular applications. The thickening portions 56 may form first and second side portions 70, 72 that extend along each side of the central portion 68, respectively. In an exemplary embodiment of the invention, first and second side portions 70, 72 may each extend the entire length of seal strip 54. Alternate embodiments allow for first and second side portions 70, 72 to extend different lengths along respective sides of the seal strip 54 as a function of the particular application.

Each side portion 70, 72 may have a thickness greater than that of the central portion 68. Each side portion 70, 72 may be wedge-shaped, being thicker adjacent the central portion 68 and thinner toward the edges of the seal strip 54. Each thickening portion 56 may be wedge-shaped. In an exemplary embodiment of the invention, each thickening portion 56 may be uniformly sized and shaped along the entire length of side portions 70, 72. Alternate embodiments allow for each thickening portion 56 to vary in size and shape along a portion or all of each side portion 70, 72 to accommodate any particular sealing situation. Each side portion 70, 72 may be formed of a linear array of thickening portions 56, which may be in the form of base-in prisms separated by transverse slots 55 as shown. The term "base-in prism" herein means a triangular prismatic thickening portion as shown, with a base of the triangle adjacent and normal to the central portion 68, and a thickness that tapers distally toward the respective adjacent edge of the seal strip 54. An apex of each prism may meet the adjacent edge of the seal strip 54 as shown. The prisms may be formed integrally with the strip 54 or they may be attached thereto, for example, by diffusion bonding or transient liquid phase bonding. The second end of the seal strip 54 may have a reduced and/or tapered thickness 74 as shown for easy insertion into the side slot 49. The transverse slots 55 may have a bottom surface or wall coplanar with an upper surface of the imperforate minimum thickness of the seal strip 54.

Figure 6:
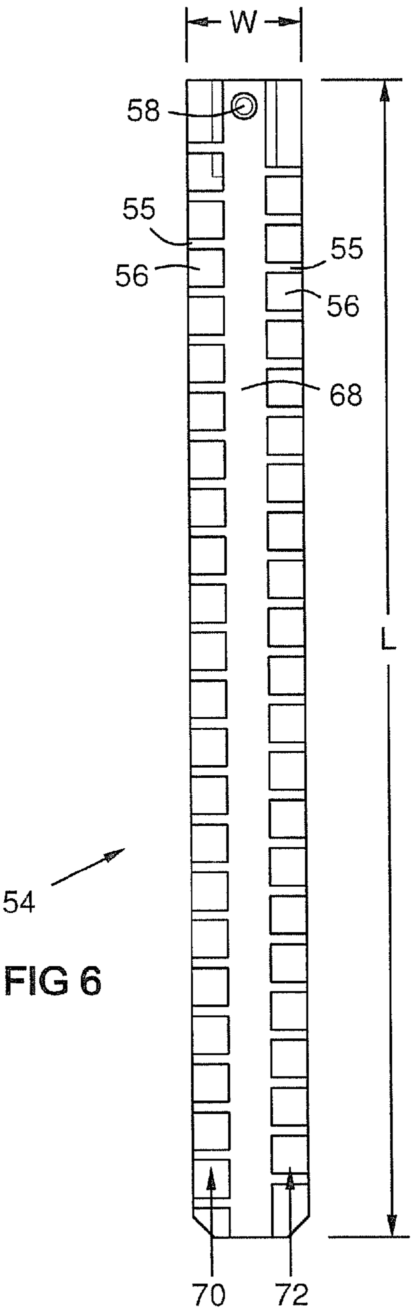
FIG. 6 is a front view of the exemplary seal strip of FIG. 5.

FIG. 6 is a front view of a seal strip 54 with a central portion 68 and two side portions 70, 72. Each side portion 70, 72 may be formed of a linear array of thickening portions 56 separated by transverse slots 55 along the length L of the seal strip 54. The width W of the seal strip 54 between its two side edges is indicated. The transverse slots 55 of the first side portion 70 may be offset from or unaligned with the transverse slots 55 of the second side portion 72 along the length of the seal strip 54 as shown. This makes insertion of the seal strip 54 into the side slot 49 smoother and reduces stress concentrations in the seal strip 54.

Figure 7:
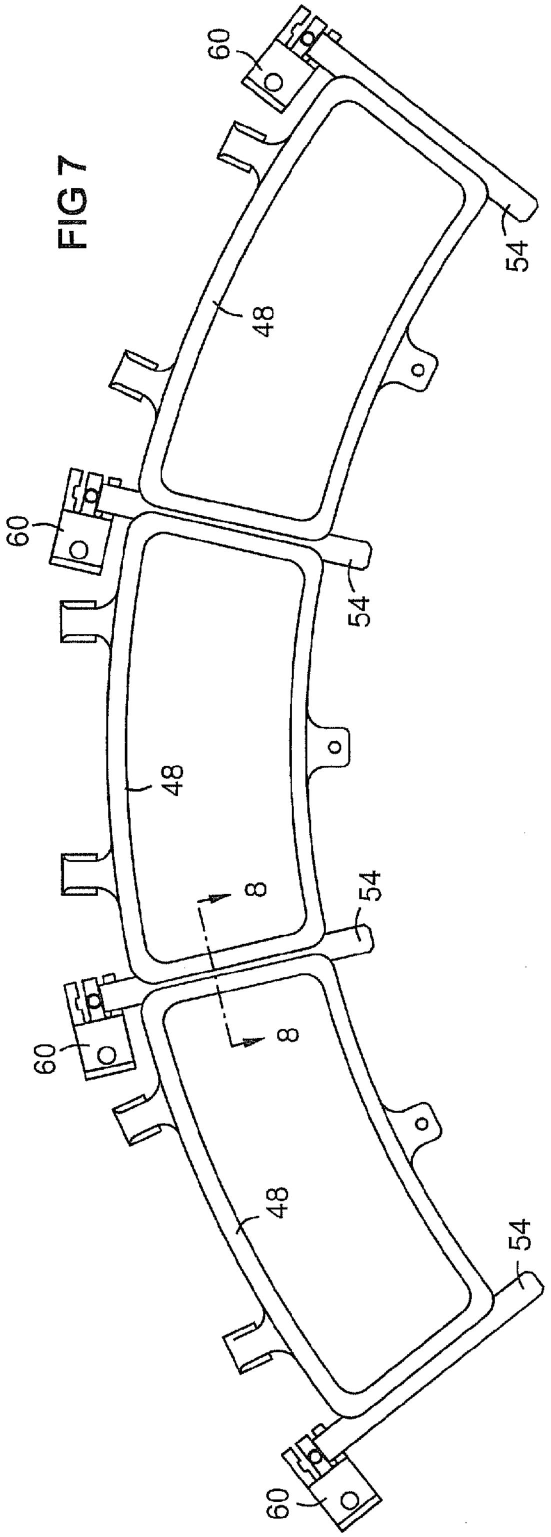
FIG. 7 is a rear view of three adjacent exit frames with exemplary side seal strips between them.

FIG. 7 is a rear or downstream view of three adjacent exit frames 48 with exemplary embodiments of side seal strips 54 between them. The upper and lower seals 50, 52 of FIG. 2 are absent in this view. All of the retention blocks 60 are oriented in the same circumferential direction in this view. However, this consistency is not necessary if the retention blocks 60 are symmetric as previously described.

Figure 8:
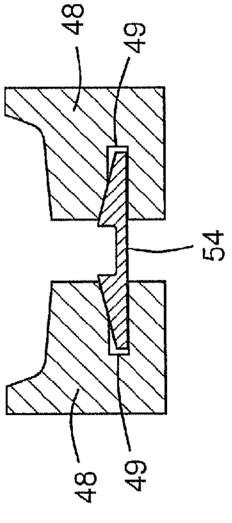
FIG. 8 is a sectional view taken along line 8-8 of FIG. 7.

FIG. 8 is a sectional view taken along line 8-8 of FIG. 7 showing opposed side slots 49 in two adjacent exit frames 48, and a side seal strip 54 slidably mounted therein. Each of the two opposed slots 49 may have an inner surface with a taper angle matching a taper of a respective one of the side portions 70, 72, causing the seal strip 54 to seat over an area of each of said tapered inner surfaces.

Figure 9:
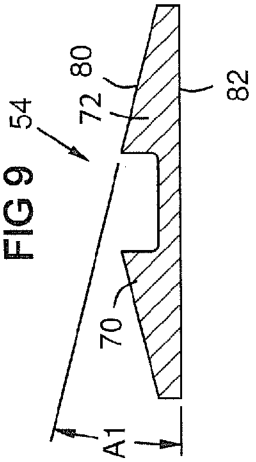
FIG. 9 is a transverse sectional view of an exemplary seal strip showing a taper angle.

FIG. 9 is a transverse sectional view of a seal strip 54 showing a taper angle A1 of a side portion 72. The taper angle A1 may be measured between two opposing sealing contact surfaces 80, 82. The taper angle A1 should be large enough to avoid binding of the seal strip 54 in the slot 49, but not so large that the maximum thickness becomes excessive, for example to avoid stress and deformation from differential heating/cooling on the front and back sides of the seal strip 54. An exemplary range for angle A1 is 10 to 20 degrees, or 14 to 16 degrees.

The present exit frame side seal 54 apparatus allows for consistent sealing characteristics during extreme thermal operating conditions while preventing undesirable load transfer between adjacent combustion systems and turbine system hardware. The geometry of the side seal 54 provides minimum clearance between the individual exit frame 48 and seal 54 to prevent excessive dynamic excitation and consequential leakage and wear on the seal 54 and combustion system exit frames 48. This exit frame side seal 54 apparatus improves combustion system durability by reducing leakage and dynamic motion. These seal 54 performance improvements lead to an extension of overall combustion system performance and a reduction in exit frame 48 wear.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. A turbine combustion system transition exit seal apparatus comprising:

a seal strip comprising a length, a width, an imperforate minimum thickness, a central portion with a first thickness over the length of the strip, and first and second side portions, each side portion comprising a thickness greater than the first thickness adjacent the central portion along the length of the strip;

wherein the first and second side portions comprise a respective first and second series of transverse slots along the length of the strip, wherein each side portion comprises a linear array of base-in prisms separated by the respective series of transverse slots, wherein the base of each prism is oriented toward the central portion along the length of the strip, and wherein the seal strip is slidably mounted into two opposed slots in two respective adjacent turbine combustion system transition exit frames.

2. The seal apparatus of claim 1, wherein the first thickness is the minimum thickness of the seal strip, and the transverse slots each define regions of the minimum thickness within the respective side portions.

3. The seal apparatus of claim 1, wherein each of the side portions taper in thickness distally toward respective first and second edges of the strip with a taper angle of 10 to 20 degrees measured between two opposed sealing surfaces of the seal strip, and the transverse slots of the first series are unaligned with the transverse slots of the second series along the length of the strip.

4. The seal apparatus of claim 3, wherein each of the two opposed slots in the two respective adjacent transition exit frames comprises an inner surface with a tapered portion matching the taper angle of a respective one of the side portions.

5. The seal apparatus of claim 1, further comprising a retention pin extending normally from the central portion of the seal strip proximate a first end of the seal strip.

6. The seal apparatus of claim 5, further comprising a retention block comprising:

a mounting hole;

an alignment pin extending from the retention block along an axis parallel to an axis of the mounting hole; and a first retention pin receiver slot in the retention block, the first retention pin receiver slot comprising a distal wall with a retention well for receiving the retention pin of the seal strip.

7. The seal apparatus of claim 6, further comprising:

a second retention pin receiver slot in the retention block, the second retention pin receiver slot comprising a second distal wall with a second retention well for alternately receiving the retention pin of the seal strip; and wherein the retention block is symmetric about a plane defined by the axes of the mounting hole and the alignment pin, and the alignment pin is centered between the two retention wells.

8. A turbine combustion system transition exit seal apparatus comprising:

a seal strip comprising a length, a width, a central portion with a first thickness over the length of the strip, and first and second wedge-shaped side portions adjacent the central portion, each side portion comprising a thickness greater than the first thickness and a taper angle of 10 to 20 degrees measured between two opposed sealing surfaces of the seal strip; and a retention pin extending normally from the central portion of the seal strip at a first end of the seal strip;

wherein the first and second wedge-shaped side portions comprise respective first and second linear arrays of base-in prisms, wherein the base is a face of the prism perpendicular to a surface of the central portion and oriented toward the central portion along the length of the strip, and each base-in prism tapers in thickness distally toward an adjacent edge of the seal strip, and wherein the seal strip is slidably mounted into two opposed slots in two respective adjacent turbine combustion system transition exit frames.

9. The seal apparatus of claim 8, wherein the base-in prisms of each linear array are separated by transverse slots, and the transverse slots of the first linear array are unaligned with the transverse slots of the second linear array along the length of the seal strip.

10. The seal apparatus of claim 8, further comprising a retention block comprising:

first and second retention wells for alternately receiving the retention pin of the seal strip;

an alignment pin extending from the retention block from a position located at the geometric center between the retention wells; and a bolt hole;

wherein the bolt hole and the alignment pin have parallel axes that are also parallel with the retention pin, and the retention block is symmetric about a plane defined by said parallel axes.

11. The seal apparatus of claim 10, wherein each of the two opposed slots comprise an inner surface with a taper matching a taper of a respective one of the wedge-shaped side portions, wherein the seal strip seats over an area of each of said tapered inner surfaces.

12. A turbine combustion system transition exit seal apparatus comprising:

an elongate strip with an imperforate planar minimum thickness and a width between first and second edges;

wherein the strip increases in thickness from each edge inward for a given distance to a maximum thickness, forming first and second wedges that taper in thickness distally toward the respective first and second edges with a taper angle of 10 to 20 degrees;

wherein the strip has a central portion along a length of the strip with a reduced thickness that is less than the maximum thickness;

a plurality of transverse slots in each of the wedges along the length of the strip, wherein the transverse slots do not penetrate the minimum thickness of the strip, wherein each of the first and second wedges forms a linear array of base-in prisms separated by the respective series of transverse slots, wherein the base of each prism is oriented toward the central portion along the length of the strip, and wherein the seal strip is slidably mounted into two opposed slots in two respective adjacent turbine combustion system transition exit frames.

13. The seal apparatus of claim 12, wherein the transverse slots of the first wedge are unaligned with the transverse slots of the second wedge along the length of the seal strip.

14. The seal apparatus of claim 12, further comprising a retention pin oriented normally to a plane of minimum thickness of the strip, wherein the retention pin is disposed proximate a first end of the strip.

15. The seal apparatus of claim 14, further comprising a retention block, wherein the retention pin is retained in the retention block.

* * * * *